US008080806B2

(12) United States Patent
Suyama et al.

(10) Patent No.: US 8,080,806 B2

(45) Date of Patent: Dec. 20, 2011

(54) ELECTRON TUBE

(75) Inventors: Motohiro Suyama, Hamamatsu (JP); Atsuhito Fukasawa, Hamamatsu (JP); Katsushi Arisaka, Los Angeles, CA (US); Hanguo Wang, North Hills, CA (US)

(73) Assignees: Hamamatsu Photonics K.K., Hammatsu-shi, Shizuoka (JP); The Regents of the University of California, Oakland, CA (US)

( * ) Notice: Subject to any disclaimer, the term of this patent is extended or adjusted under 35 U.S.C. 154(b) by 354 days.

(21) Appl. No.: 12/257,105

(22) Filed: Oct. 23, 2008

(65) Prior Publication Data

US 2010/0102408 A1 Apr. 29, 2010

(51) Int. Cl.
*G01T 1/20* (2006.01)

(52) U.S. Cl. .................................................. 250/370.11

(58) Field of Classification Search .............. 250/370.11
See application file for complete search history.

(56) References Cited

U.S. PATENT DOCUMENTS

| | | | | |
|---|---|---|---|---|
| 5,374,826 | A | 12/1994 | LaRue et al. | |
| 6,297,489 | B1 * | 10/2001 | Suyama et al. | 250/207 |
| 2002/0079823 | A1 * | 6/2002 | Gehring et al. | 313/446 |
| 2007/0029930 | A1 | 2/2007 | Suyama et al. | |
| 2007/0069645 | A1 * | 3/2007 | Kyushima et al. | 313/532 |

FOREIGN PATENT DOCUMENTS

| | | |
|---|---|---|
| JP | 7-51729 | 11/1995 |
| JP | 7-320681 | 12/1995 |
| JP | 10-332478 | 12/1998 |

OTHER PUBLICATIONS

R. Kalibjian, "A Phototube Using a Semiconductor Diode as the Multiplier Element," IEEE Transactions on Nuclear Science, Jun. 1966, pp. 54-62.

K. Arisaka et al., "XAX: a multi-ton, multi-target detection system for dark matter, double beta decay and pp solar neutrinos," pp. 1-16.

K. Arisaka, "XAX 10 ton Noble-Liquid Double-Phase TPC for Rare Processes," MS Power Point presentation at DUSEL Town Meeting, Washington, D.C., Nov. 3, 2007, pp. 1-19 (with two (2) page Town Meeting announcement).

* cited by examiner

*Primary Examiner* — David Porta
*Assistant Examiner* — Christine Sung
(74) *Attorney, Agent, or Firm* — Drinker Biddle & Reath LLP

(57) ABSTRACT

An electron tube of the present invention includes: a vacuum vessel including a face plate portion made of synthetic silica and having a surface on which a photoelectric surface is provided, a stem portion arranged facing the photoelectric surface and made of synthetic silica, and a side tube portion having one end connected to the face plate portion and the other end connected to the stem portion and made of synthetic silica; a projection portion arranged in the vacuum vessel, extending from the stem portion toward the photoelectric surface, and made of synthetic silica; and an electron detector arranged on the projection portion, for detecting electrons from the photoelectric surface, and made of silicon.

5 Claims, 3 Drawing Sheets

ELECTRON TUBE

GOVERNMENT SUPPORT

The invention described herein was made with support of the U.S. Government, including Grant No. DE-FG02-91ER40662 awarded by the Department of Energy and Grant No. PHY0139065 awarded by the National Science Foundation, and it is acknowledged that the United States Government has certain rights in the invention.

BACKGROUND OF THE INVENTION

1. Field of the Invention

The present invention relates to an electron tube.

2. Related Background Art

U.S. Pat. No. 5,374,826 discloses an electron tube with a housing including a window, a sidewall, and an electrode. In this electron tube, due to radioactive impurities contained in ceramic being a material of the sidewall, a minute quantity of radiation is emitted. Moreover, in the electron tube, borosilicate glass is often used as a material of the window and housing, and metal is used as a material of the electrode. Radioactive impurities contained in the borosilicate glass, metal, etc., also emit a minute quantity of radiation.

In, for example, an observational experiment of dark matter, an observational experiment of various cosmic rays, etc., using a scintillator that emits light upon incidence of radiation, since a signal light itself from a detection target is often weak, it is necessary to reduce noise as much as possible. Here, when an electron tube that converts light from a scintillator to electrons is used for detection, a light emission due to a minute quantity of radiation generated from the electron tube itself results in noise.

SUMMARY OF THE INVENTION

An electron tube of the present invention includes: a vacuum vessel including a face plate portion made of synthetic silica and having a surface on which a photoelectric surface is provided, a stem portion arranged facing the photoelectric surface and made of synthetic silica, and a side tube portion having one end connected to the face plate portion and the other end connected to the stem portion and made of synthetic silica; a projection portion arranged in the vacuum vessel, extending from the stem portion toward the photoelectric surface, and made of synthetic silica; and an electron detector arranged on the projection portion, for detecting electrons from the photoelectric surface, and made of silicon.

DESCRIPTION OF THE PREFERRED EMBODIMENTS

Figure 1:
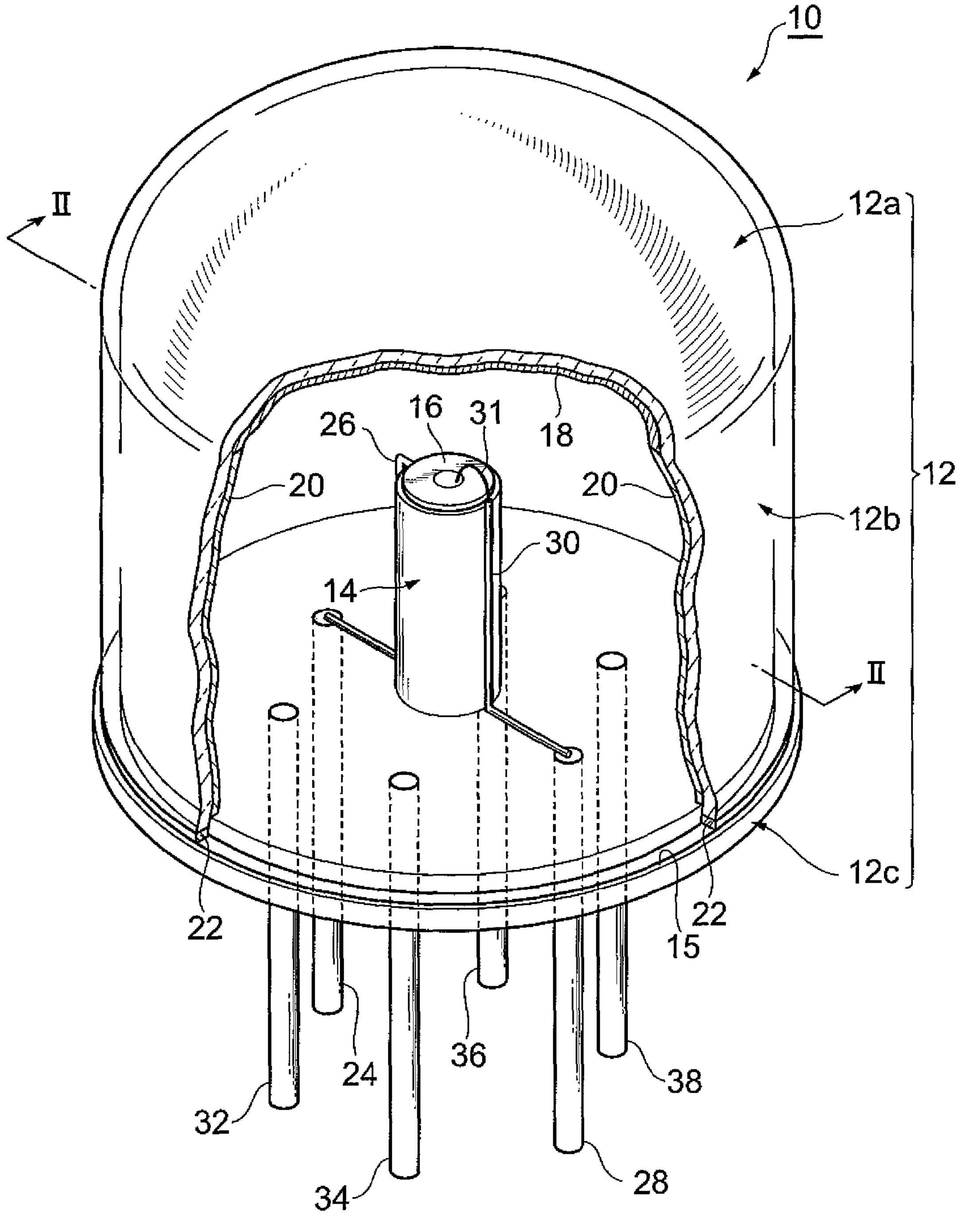
FIG. 1 is a perspective view, partially broken away, schematically showing an electron tube according to an embodiment.

Hereinafter, a preferred embodiment of the present invention will be described in detail with reference to accompanying drawings. For easy understanding of the description, components that are identical in the respective drawings are denoted whenever possible by identical reference numerals and overlapping description will be omitted.

Figure 2:
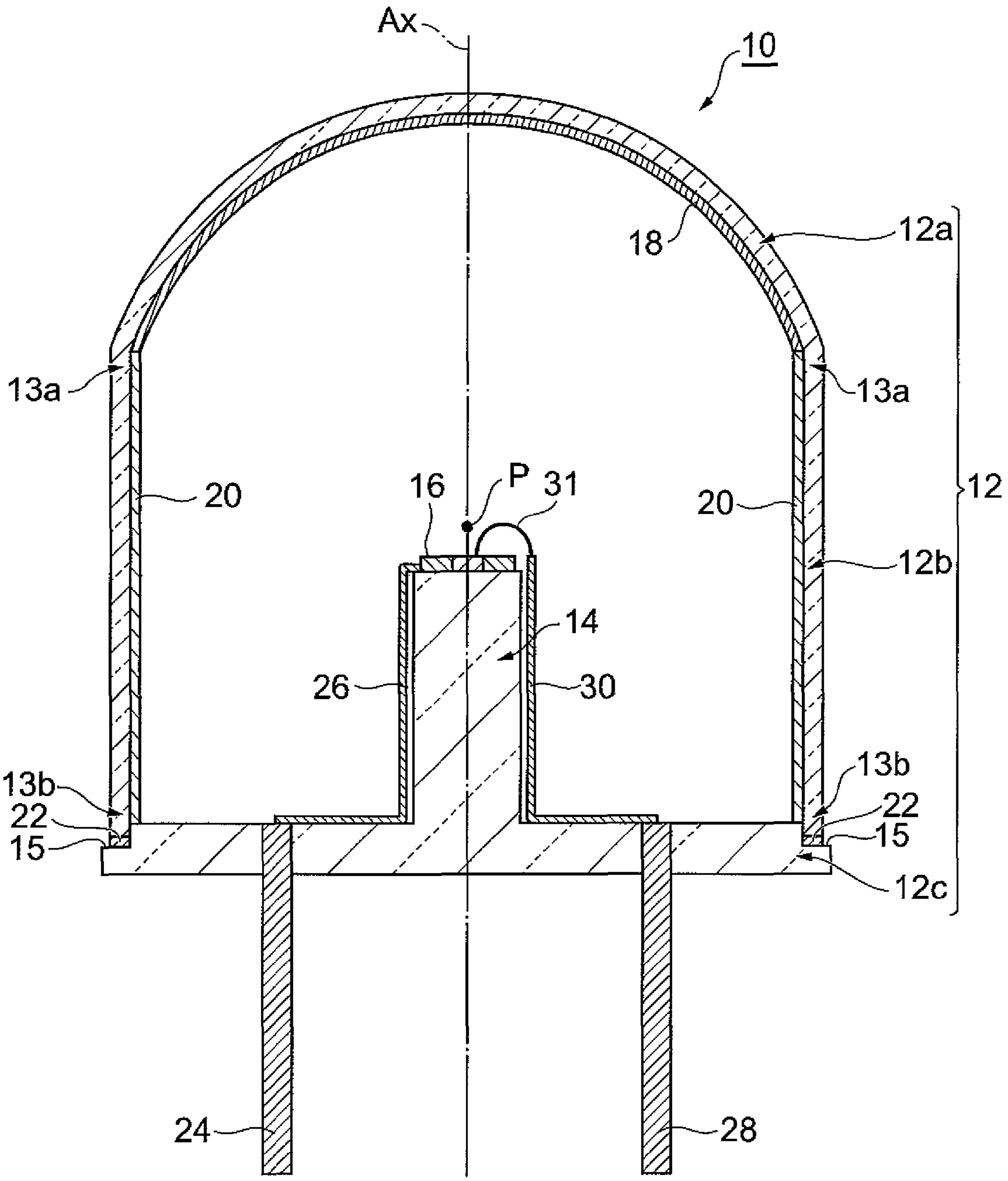
FIG. 2 is a sectional view along a line II-II shown in FIG. 1.
Figure 3:
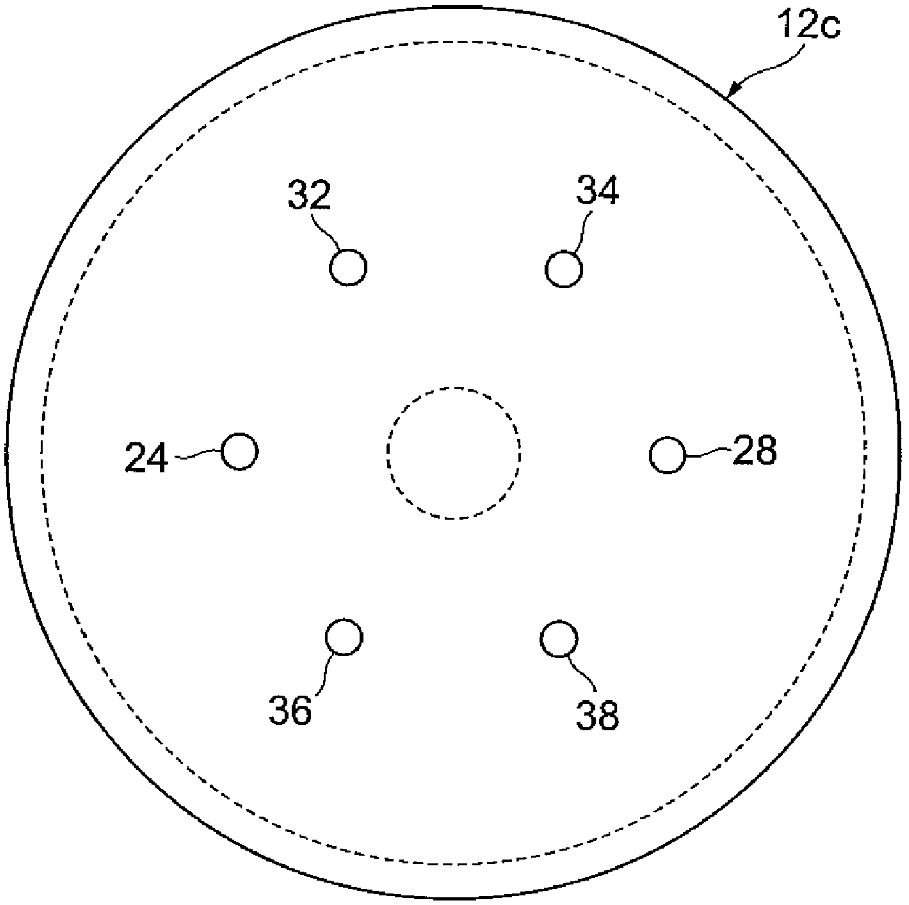
FIG. 3 is a bottom view of an electron tube according to an embodiment.

FIG. 1 is a perspective view, partially broken away, schematically showing an electron tube according to an embodiment. FIG. 2 is a sectional view along a line II-II shown in FIG. 1. FIG. 3 is a bottom view of an electron tube according to an embodiment. As shown in FIG. 1 to FIG. 3, an electron tube 10 includes a vacuum vessel 12 that maintains a vacuum inside, a projection portion 14 arranged in the vacuum vessel 12, and an electron detector 16 arranged on the projection portion 14.

The vacuum vessel 12 includes a face plate portion 12*a* having a surface on which a photoelectric surface 18 is provided, a side tube portion 12*b*, a stem portion 12*c* arranged facing the photoelectric surface 18. The face plate portion 12*a*, the side tube portion 12*b*, and the stem portion 12*c* are made of synthetic silica.

The face plate portion 12*a* has, for example, a dome shape or a spherical shape, but may have a flat plate shape. A section in the thickness direction of the face plate portion 12*a* extends along an arc having a center at a predetermined position P, on a tube axis Ax of the electron tube 10, between the photoelectric surface 18 and the electron detector 16. The photoelectric surface 18 is arranged at the vacuum side of the face plate portion 12*a*, converts light that has reached the photoelectric surface 18 through the face plate portion 12*a* from the outside to electrons, and emits the electrons toward the electron detector 16. The photoelectric surface 18 functions as a photocathode. The voltage of the photoelectric surface 18 is, for example, −10 kV The photoelectric surface 18 is a bialkali photoelectric surface of, for example, K2CsSb.

The side tube portion 12*b* has one end 13*a* connected to a marginal part of the face plate portion 12*a* and the other end 13*b* connected to a marginal part of the stem portion 12*c*. The side tube portion 12*b* has, for example, a circular cylindrical shape. An inner wall of the side tube portion 12*b* is provided with a metal film 20 electrically connected with the photoelectric surface 18. The metal film 20 is made of, for example, aluminum. The metal film 20 focuses photoelectrons from the photoelectric surface 18 toward the electron detector 16. If focusing of the photoelectrons is sufficient, the metal film 20 may not be formed.

The stem portion 12*c* has, for example, a disk shape. The stem portion 12*c* is attached with an n-side electrode pin 24 and a p-side electrode pin 28. The n-side electrode pin 24 and the p-side electrode pin 28 are made of, for example, a metal such as Kovar. The n-side electrode pin 24 penetrates through the stem portion 12*c*. To a tip of is the n-side electrode pin 24 located in the vacuum vessel 12, one end of a metal wire 26 made of Kovar is electrically connected. The other end of the metal wire 26 is electrically connected to an n-type region of the electron detector 16. The p-side electrode pin 28 penetrates through the stem portion 12*c*. To a tip of the p-side electrode pin 28 located in the vacuum vessel 12, one end of a metal wire 30 made of Kovar is electrically connected. The other end of the metal wire 30 is electrically connected to a p-type region (electron incident surface) of the electron detector 16 via a thin wire 31 made of Au (gold). The metal wires 26 and 30 are formed so as to trail on the surface of the stem portion 12*c* and the projection portion 14. In addition, the stem portion 12*c* is attached with getter pins 32, 34, 36, and 38 to energize an unillustrated getter. The getter pins 32, 34, 36, and 38 penetrate through the stem portion 12*c*. The n-side electrode pin 24, the p-side electrode pin 28, and the getter pins 32, 34, 36, and 38 are arranged on a circumference that surrounds the projection portion 14.

The face plate portion 12*a*, the side tube portion 12*b*, and the stem portion 12*c* may be provided as separate pieces from each other, or adjacent members thereof may be integrated with each other. In the present embodiment, the face plate portion 12*a* and the side tube portion 12*b* are integrated. The side tube portion 12*b* and the stem portion 12*c* are provided as separate pieces from each other, and sealed by a sealant 22. A step 15 is formed at the marginal part of the stem portion 12*c*. The thickness of the marginal part of the stem portion 12*c* is thinner than the thickness of a central part of the stem portion 12*c*. The step 15 is fitted with the other end 13*b* of the side tube portion 12*b*.

The projection portion 14 extends from the central part of the stem portion 12*c* toward the photoelectric surface 18, and is made of synthetic silica. The projection portion 14 may be integrated with the stem portion 12*c*, or may be provided separately therefrom. The projection portion 14 has, for example, a columnar shape that is almost coaxial with the side tube portion 12*b*.

The electron detector 16 detects electrons emitted from the photoelectric surface 18, and outputs an electrical signal to the outside via the n-side electrode pin 24 or the p-side electrode pin 28. The electron detector 16 is made of silicon. The electron detector 16 has, for example, a disk shape. The electron detector 16 is, for example, an avalanche photodiode, but may be another photodiode. As an example of voltage to be applied to the electron detector 16, a voltage of +400 volts can be applied to the n-side electrode pin 24, while the p-side electrode pin 28 can provided at a ground potential. In this case, a signal is extracted from the p-side electrode pin 28.

In the electron tube 10 of the present embodiment, the face plate portion 12*a*, the stem portion 12*c*, the side tube portion 12*b*, and the projection portion 14 are made of synthetic silica, and the electron detector 16 is made of silicon. Since the content of radioactive impurities contained in the synthetic silica and silicon is small, the quantity of radiation to be generated from the electron tube 10 itself is reduced.

Moreover, if the metal film 20 is formed on the inner wall of the side tube portion 12*b*, an electric field favorable for electron focusing can be formed in the electron tube 10. Moreover, if a section in the thickness direction of the face plate portion 12*a* extends along an arc having a center at the predetermined position P, on the tube axis Ax of the electron tube 10, between the photoelectric surface 18 and the electron detector 16, the distance between the photoelectric surface 18 and the electron detector 16 is almost fixed across the entire photoelectric surface 18. Moreover, if the electron detector 16 is an avalanche photodiode, output of the electron detector 16 is increased.

The electron tube 10 can be used in combination with a scintillator as a radiation detector. In that case, since the quantity of radiation to be generated from the electron tube 10 is reduced, noise at the time of radiation detection is reduced. In particular, since the electron tube 10 has a structure without a dynode being an electron-multiplier section made of a metal, the quantity of radiation to be generated from the electron tube 10 is further reduced by using the electron tube 10. Therefore, usage of the electron tube 10 is particularly effective for detecting a minute quantity of radiation. It is preferable to arrange a plurality of electron tubes 10 so as to surround the scintillator. For the scintillator, Xe may be used, or Ar may be used. A radiation detector thus constructed can be used for an observational experiment of dark matter.

The electron tube 10 is manufactured, in a vacuum, by sealing the side tube portion 12*b* and the stem portion 12*c* by the sealant 22. Before sealing, the a-side electrode pin 24, the p-side electrode pin 28, and the getter pins 32, 34, 36, and 38 are inserted in the stem portion 12*c*, the electron detector 16 is installed on the projection portion 14, the n-side electrode pin 24 and the electron detector 16 are electrically connected by the metal wire 26, and the p-side electrode pin 28 and the electron detector 16 are electrically connected by the metal wire 30 and the thin wire 31.

Although a preferred embodiment of the present invention has been described in detail in the above, the present invention is by no means limited to the above embodiment, or by no means limited to a construction that provides the above various effects.

Here, the generation quantity of radiation was measured in terms of a Kovar glass (borosilicate glass), Kovar (Fe—Ni—Co alloy), and synthetic silica in order to confirm that the generation quantity of radiation is small in synthetic silica. In the measurement, Corning 7056 was used as a sample of the Kovar glass, and KV-2, as a sample of Kovar, and an ES grade, as a sample of synthetic silica. Concretely, a germanium radiation detector manufactured by EG&G Inc. was used to measure the energy and count of gamma rays emitted by radioactive impurities contained in the samples. The measured radioactive impurities were 40K (a radioisotope of potassium), a uranium series (a decay series from uranium-238 to lead-206, and a thorium series (a decay series from thorium-232 to lead-208).

Measurement results are shown in Table 1. The figures in the table are in units of Bq/kg.

TABLE 1

| | 40K | Uranium series | Thorium series |
|---|---|---|---|
| Kovar glass | 1500 | 10 | 1 |
| Kovar | 0.1 | 0.2 | 0.1 |
| Synthetic silica | 0 | 0.002 | 0 |

What is claimed is:

1. An electron tube comprising:

a vacuum vessel including a face plate portion made of synthetic silica and having a surface on which a photoelectric surface is provided, a stem portion arranged facing the photoelectric surface and made of synthetic silica, and a side tube portion having one end connected to the face plate portion and an other end connected to the stem portion and made of synthetic silica;

a projection portion arranged in the vacuum vessel, extending from the stem portion toward the photoelectric surface, and made of synthetic silica;

an electron detector arranged on the projection portion, for detecting electrons from the photoelectric surface, and made of silicon; and a plurality of electrodes penetrating through the stem portion and arranged on a circumference that surrounds the projection portion.

2. The electron tube according to claim 1, further comprising a metal film provided on an inner wall of the side tube portion and electrically connected with the photoelectric surface.

3. The electron tube according to claim 1, wherein a section in a thickness direction of the face plate portion extends along an arc having a center at a predetermined position, on a tube axis of the electron tube, between the photoelectric surface and the electron detector.

4. The electron tube according to claim 1, wherein the electron detector is an avalanche photodiode.

5. The electron tube according to claim 1, wherein a step portion is formed where the stem portion meets the side tube portion.

* * * * *